United States Patent [19]

Loren

[11] Patent Number: 4,708,398

[45] Date of Patent: Nov. 24, 1987

[54] WHEEL COVER RETENTION SYSTEM WITH PILOT RIBS

[75] Inventor: Norman S. Loren, Warren, Mich.

[73] Assignee: Michael Ladney, Jr., Sterling Heights

[21] Appl. No.: 779,631

[22] Filed: Sep. 24, 1985

[51] Int. Cl.⁴ .............................................. B60B 7/00
[52] U.S. Cl. ........................... 301/37 PB; 301/37 TP; 301/37 R
[58] Field of Search ................ 301/37 R, 37 P, 37 T, 301/37 TP, 37 PB, 108 R, 108 S

[56] References Cited

U.S. PATENT DOCUMENTS

| | | | |
|---|---|---|---|
| 3,747,984 | 7/1973 | Andrews et al. | 301/37 P |
| 4,027,919 | 6/1977 | Foster et al. | 301/37 P X |
| 4,366,992 | 1/1983 | Enke | 301/37 PB X |
| 4,457,559 | 7/1984 | Renz | 301/37 R X |
| 4,458,952 | 7/1984 | Foster et al. | 301/37 P X |
| 4,470,639 | 9/1984 | Loper | 301/37 PB |
| 4,529,251 | 7/1985 | Schobbe | 301/37 P |
| 4,531,786 | 7/1985 | Renz et al. | 301/37 PB |
| 4,572,584 | 2/1986 | Brown | 301/37 P X |

FOREIGN PATENT DOCUMENTS

| | | | |
|---|---|---|---|
| 3016619 | 11/1981 | Fed. Rep. of Germany | 301/37 R |
| 0112802 | 7/1983 | Japan | 301/37 R |

Primary Examiner—Robert B. Reeves
Assistant Examiner—Russell D. Stormer
Attorney, Agent, or Firm—Brooks & Kushman

[57] ABSTRACT

A wheel cover installation and retention system for a wheel including a circumferential retention groove. The wheel cover includes pilot ribs for first engaging the inner surface of the wheel at a plurality of preselected positions on the wheel and preventing radial movement of the wheel cover relative to the wheel during installation, retention fingers for engaging the circumferential retention groove at a plurality of preselected locations on the wheel, and a spring member contacting the retention fingers and exerting a radially outward force on the retention fingers, thereby urging the retention fingers into the circumferential retention groove on the wheel.

9 Claims, 11 Drawing Figures

WHEEL COVER RETENTION SYSTEM WITH PILOT RIBS

TECHNICAL FIELD

The present invention relates to wheel ornamentation, including wheel covers and hubcaps (hereinafter referred to collectively as wheel covers), and in particular to wheel covers including means for facilitating easy installation and retention of the wheel cover on a vehicle wheel.

BACKGROUND OF THE INVENTION

Wheel cover retention systems including compressible wire springs and/or spring clips are widely used to secure a wheel cover in position on a wheel, particularly where a substantial portion of the wheel cover is plastic. The wire spring is typically characterized by a pluraliy of circumferentially spaced loops which project radially outward into engagement with the wheel. Each loop experiences radially inward loading during installation of the wheel cover. The spring load is typically transmitted to a flexator which interconnects each loop and bows in response to the radial loading of the spring.

The wire spring or spring clip can be mounted on or within a plurality of fingers molded into and extending axially inward from the rear face of the wheel cover. The fingers typically have resilience to experience the radial inward travel necessary to accomplish loading of the spring through the interference fit with the wheel. It is often difficult, however, to install the wheel cover since the force required to compress the spring radially offsets the wheel cover instead of compressing the fingers and the spring. Thus, several attempts at installation are often necessary in order to maintain the wheel cover in the correct axial alignment with the wheel while providing the force necessary to compress the fingers and spring to fit within the wheel. This installation problem is particularly prevalent with wheel ornaments employing higher spring rate retention systems, such as hubcaps.

It is also known to use a plurality of circumferentially spaced ribs in conjunction with the fingers to prevent radial shifting of the wheel cover after the wheel cover has been installed on the wheel and to limit radial and axial movement of the wire relative to the wheel cover. This design typically includes a plurality of spring loaded cam tabs which first contact the wheel during installation, and a plurality of support ribs joined by a circumferential ring including retention means for holding the spring wire and limiting the wires radial motion during and after installation. As with other designs, however, the wheel cover is difficult to install. If the axial force used to install the wheel cover is not evenly distributed over the surface area of the cover (i.e. is off center) it will cause the diametrically opposite portion of the wheel cover to shift radially and climb out of the wheel.

It is therefore one object of the present invention to provide a wheel cover including a retention system which allows for quick and easy installation of the cover on a wheel.

It is another object of the present invention to provide a wheel cover including a retention system which eliminates axial or radial motion of the wheel cover relative to the wheel and establishes a secure fit of the wheel cover on the wheel.

It is another object of the present invention to provide a wheel cover including a retention system which inhibits axial and radial motion of the wire spring relative to the wheel cover during and after installation of the wheel cover on the wheel.

It is yet another object of the present invention to provide a wheel cover including a retention system which inhibits circumferential motion of the wire spring relative to the wheel cover during and after installation of the wheel cover on the wheel.

SUMMARY OF THE INVENTION

The wheel cover of the present invention includes a retention system employing a pilot means in the form of plurality of pilot ribs extending axially inward from the inside face of the wheel cover a distance greater than any of the other elements of the wheel cover that contact the wheel, retention means in the form of a plurality of flexible fingers also extending axially inward from the inside face of the wheel cover and radially outward from the circumference defined by the pilot ribs, and spring means engaging the retention fingers and imparting an outward radial force upon the fingers to urge the fingers into engagement with a circumferential retaining groove on the wheel.

The circumference defined by the pilot ribs is slightly less than the smallest circumference of the walls of the wheel. Since the pilot ribs are the first portion of the wheel cover to contact the wheel during installation, the contact ribs with the wheel force the wheel cover into limited radial alignment with the wheel and the minimize radial movement of the cover when the retaining fingers subsequently contact and are compressed by the wheels. Once installed, the pilot ribs minimize any radial movement of the wheel cover relative to the wheel that normally occurs as a result of vibration encountered during operation of the vehicle.

The spring means preferably comprise a wire member having a circular or generally circular geometric configuration. However, spring steel clips or continuous folded spring steel bands may be employed as the spring means without departing from the spirit of the invention.

The pilot ribs preferably include retaining means, in the form of slots or grooves for receiving the wire spring and limiting the axial and radial movement of the spring during and after installation of the wheel cover on the wheel.

Thus, the wheel cover retention system of the present invention insures a secure fit of the wheel cover on the wheel with limited axial or radial displacement of the wire spring within the cover, and increased likelihood of "first time" installation.

DETAILED DESCRIPTION OF THE PREFERRED EMBODIMENT OF THE INVENTION

Figure 1:
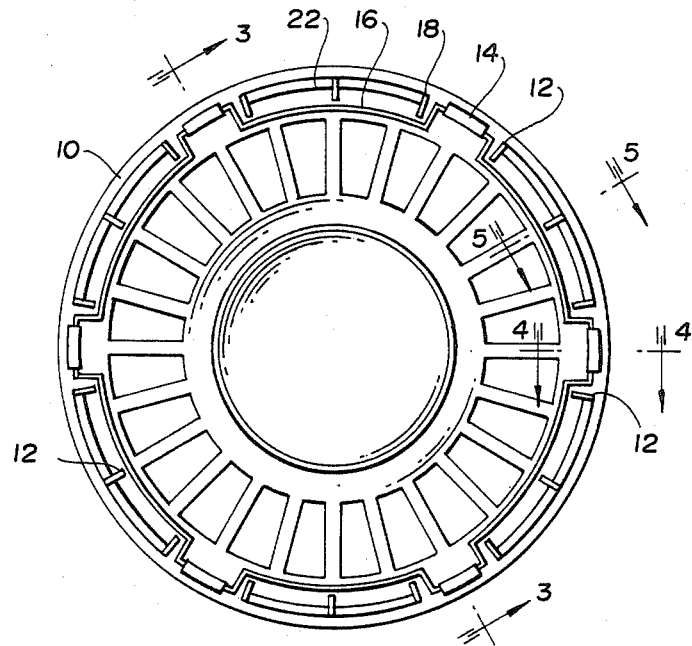
FIG. 1 is a view of the inside face of a wheel cover employing the retention system of the present invention.
Figure 2:
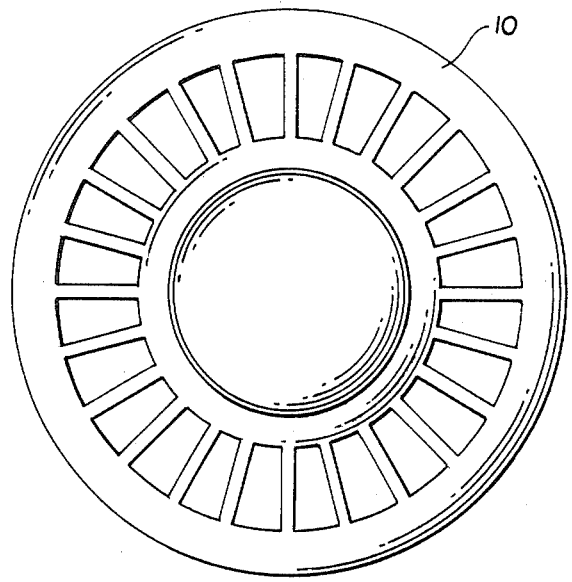
FIG. 2 is a view of the outside face of the wheel cover shown in FIG. 1.

Referring to FIGS. 1 and 2, the wheel cover 10 of the present invention employs an improved retention system including pilot means, preferably in the form of a plurality of rigid pilot ribs 12 located at preselected positions around the circumference of the inner face of the wheel cover, retention means, preferably in the form of a plurality of resilient fingers 14 also located at preselected positions around the circumference of the inner face of the wheel cover 10, and spring means, preferably in the form of a wire member 16 engaging the resilient fingers 14 and urging them radially outward in response to the radially inward displacement of the fingers 14 as the result of the fingers' interference contact with the wheel (shown in FIG. 3) when the wheel cover 10 is installed thereon.

The outer surface 18 of the pilot ribs 12 define a circumference slightly smaller than the smallest engaged circumference at the side walls 26 of the wheel 20 so that when the wheel cover 10 is installed on the wheel 20, the pilot ribs 12 contact the side walls 26 of the wheel 20, thereby preventing radial movement of the wheel cover 10 relative to the wheel 20.

The ends of the retention fingers 14 are urged radially outward by the wire member 16, defining a circumference that is slightly greater than the circumference of the groove defined by the outer shoulder 28 on the wheel 20. The wire member 16 may be circular, or may be formed into a more complex, but generally circular geometric configuration such as is shown in FIG. 1. This more complex geometric configuration is more desirable for several reasons. First, the wire member 16 may be formed in a particular shape to avoid routing the wire members 16 past openings in the wheel cover 10. Also, configured wire reduces the length of the flexator and provides greater spring force on the fingers than the simple circular design. Conventional spring wire, formed into the desired pattern and welded or otherwise secured at its ends, is preferably employed for the wire member.

The individual pilot ribs 12 may be interconnected by circumferential support ring 22 which adds rigidity to the structure.

The wheel cover 10 including the pilot ribs 12 and retention fingers 14 are preferably fabricated from commercially available plastic materials. The wheel cover 10, pilot ribs 12, and retention fingers 14 may be stamped, molded, or otherwise shaped into the desired configuration by employing fabricating methods currently known to those skilled in the art. The physical characteristics of each of the wheel covers' components, i.e. the degree of flexibility, resilience, rigidity, etc., are obtained by varying the size and shape of the components and by employing a suitable plastic material.

Figure 3:
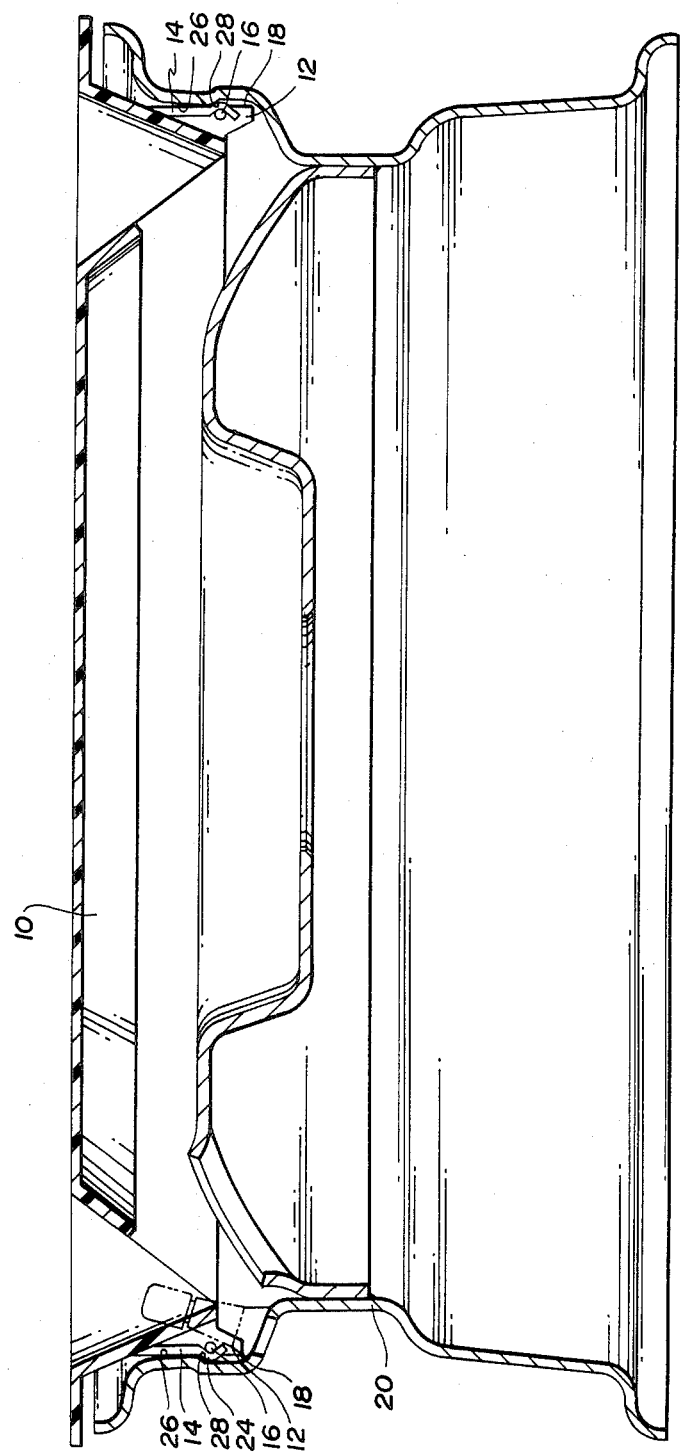
FIG. 3 is a cross section view, taken along line 3, of a wheel cover employing the retention system of the present invention installed upon a wheel.

Referring now to FIG. 3, each of the pilot ribs 12 extends axially inward farther than the rest of the wheel cover structure 10. During installation, the outer surface 18 of the pilot ribs 12 first contact the inner side walls 26 of the wheel 20, thereby preventing further radial movement of the wheel cover 10 off center during the subsequent contact and compression of the fingers 14 by the side walls 26.

Once installed, the spring force of the compressed wire member 16 urges the end portion 24 of each of the fingers 14 radially outward and into contact with the outer shoulder 28 defining the circumferential retention/safety groove on the wheel 20. It should be noted that during and after installation, only the plastic pilot ribs 12 and resilient retention fingers 14 contact the side walls 26 of the wheel 20. This plastic-metal interface greatly reduces the likelihood that the aluminum or painted metal surface of the wheel 20 will be scratched by the wheel cover during or after installation or removal.

Figure 4:
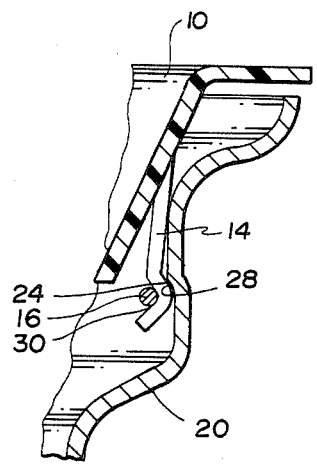
FIG. 4 is a partial cross section, taken along line 4, of one embodiment of the present invention.
Figure 5:
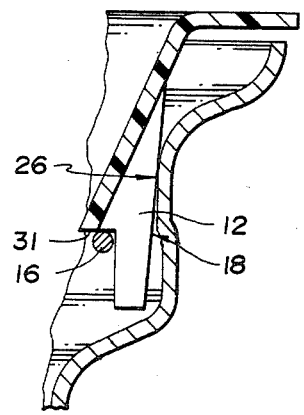
FIG. 5 is a partial cross section, taken along line 5, of one embodiment of the present invention.

Referring now to FIGS. 4 and 5, the resilient retention fingers 14 and rigid pilot ribs 12 is shown on a wheel cover 10, shown in its installed position on a wheel 20. It should be noted that the length of the resilient retention finger 14, as well as the shape of the end portion 24 of each of the fingers 14 should be varied as dictated by the particular design of the wheel cover 10 and the wheel 20. The finger 14 should be of a sufficient length so that when the wheel cover 10 is inserted into the wheel 20 to its desired installed position, the upper end portion 24 of the finger extends into and contacts the outer shoulder 28 defining the circumferential retention/safety groove on the wheel 20. The end portion 24 of the finger 14 should also include a groove 30 or other means for retaining the wire member 16 in its correct position relative to the finger 14. The pilot rib 12 preferably includes means for inhibiting the axial movement of the wire member 16 relative to the wheel cover 10 during and after installation. In the embodiment shown in FIG. 5, the wire member 16 is received within a cut out portion 31 on the underside of the pilot rib 12. This configuration prevents radial outward and axial outward motion of the wire member 16 relative to the wheel cover 10.

Figure 6:
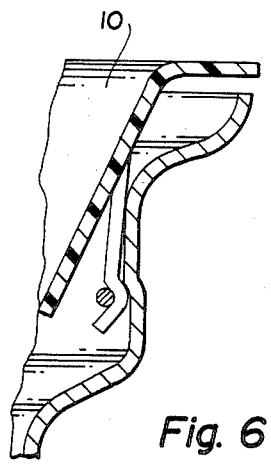
FIG. 6 is a partial cross section, taken along line 4, of a second embodiment of the present invention.
Figure 7:
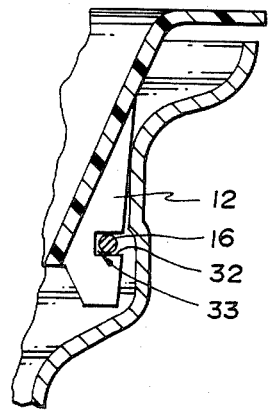
FIG. 7 is a partial cross section, taken along line 5, of a second embodiment of the present invention.

FIGS. 6 and 7 show another embodiment of a wheel cover 10 according to the present invention having a slightly different configuration. In particular, a wire member retention notch 32 is provided on the top surface of the pilot rib 12. The retention notch 32 is large enough to accommodate the wire member 16 and prevent motion of the wire member 16 in either axially direction or in the radially inward direction. It should be noted that some amount of clearance 33 must be allowed in the retention channel 32 to accommodate the radially inward motion of the wire member 16 that results from compression of the fingers 14 and the wire member 16 during installation.

Figure 8:
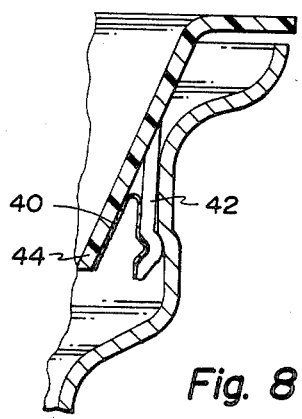
FIG. 8 is a partial cross section of a third embodiment of the present invention employing a spring clip.

Referring to FIG. 8, an alternative embodiment employs a spring clip 40 as the spring means. The spring clip 40 is a strip of resilient material configured in a shape by the opening between the underside of a retention finger 42 and circumferential support members 44 which extend axially inward from the wheel cover 10. The wheel cover 10 may employ a plurality of spring clips 40, corresponding to each of the retention fingers 42, or may comprise a continuous band which extends about the circumference of the wheel cover 10. In either case, the spring clip 40 (or spring band) exerts sufficient spring force upon the retention finger 42 that the retention finger 42 is urged outward in the same manner that the wire member 16 urges the retention finger 14 in the above described embodiments.

Figure 9:
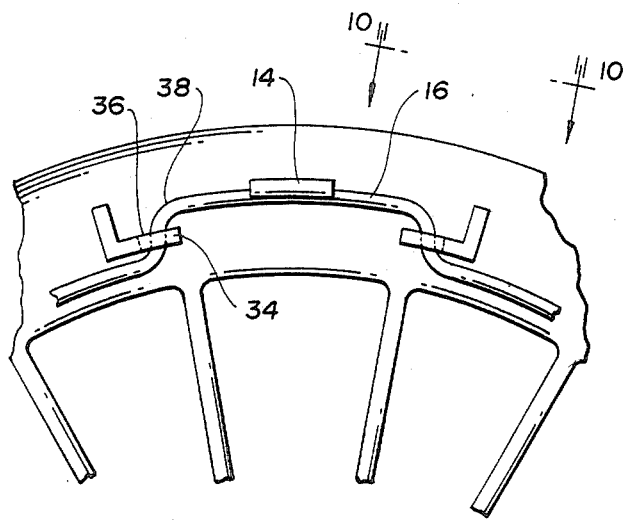
FIG. 9 is a view of a portion of the inside face of of a fourth embodiment of the present invention.
Figures 10, 11:
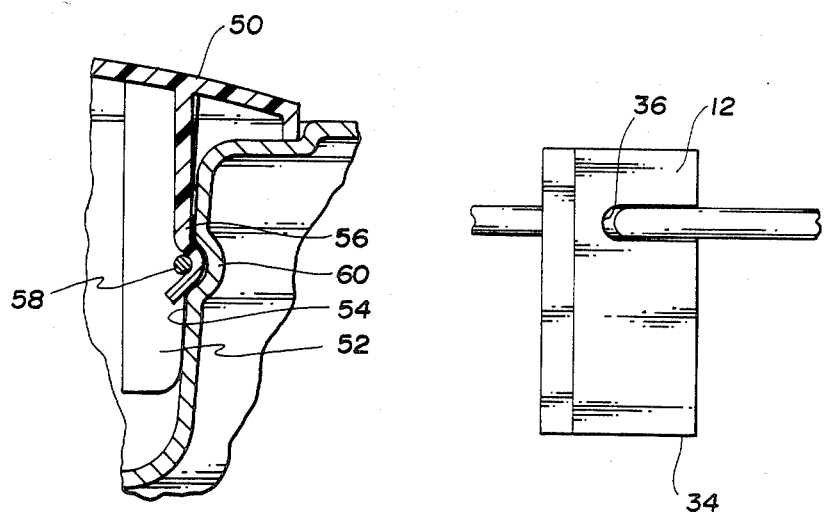
FIG. 10 is a partial top view of a pilot rib and spring wire of the fourth embodiment of the present invention.
FIG. 11 is a partial cross section of a hubcap employing a fifth embodiment of the retention system of the present invention.

FIGS. 9 and 10 show yet another embodiment employing a different pilot rib 12 and wire member 16 design. In this embodiment, the pilot rib 12 includes a radial side wall portion 34 including a slot 36 defined thereon for receiving the wire member 16 and limiting axial travel of the wire member 16 in either direction. It should be noted that the pilot rib 12 also restricts circumferential motion of the wire members 16 relative to the wheel cover 10. It will be appreciated by those skilled in the art that the wire member 16 can quickly and easily be installed by sliding each of the projecting portions 38 of the wire member 16 radially outward through the slots 36 and the pilot ribs 12 and into contact with the underside of the retention fingers 14.

FIG. 11 shows a partial cross section view of a hubcap 50 employing the retention system of the present invention. As with the previously described embodiments, the hubcap 50 includes a plurality of rigid pilot ribs 52 located about the circumference of the hubcap 50, and defining a circumference slightly smaller than the smallest engaged circumference at the side walls 54 of the wheel. Similarly, a plurality of retention fingers 56 are urged outward by a spring means, preferably in the form of a wire member 58 into a circumferential groove 60 in the wheel. The pilot ribs 52 are particularly important on the relatively smaller hubcaps 50 since there is typically a larger spring force urging the retention fingers 56 outward for the relatively smaller circumference wheel ornament.

It is thought that the wheel cover retention system including pilot means and many of the its attendant advantages will be understood from the foregoing description. It will be apparent to those skilled in the art that various changes may be made in the form, construction and arrangement of the components of the system, as dictated by aesthetic and design considerations, without departing from the spirit and scope of the invention.

What is claimed is:

1. A wheel cover for a wheel having a generally annular wheel portion including a circumferential retention groove, the wheel cover including:
   a plurality of rigid pilot ribs located at a first set of preselected points about the circumference of the inner face of the wheel cover and extending axially inward from the inner face of the wheel cover, the pilot ribs defining a circumference slightly smaller than the smallest circumference on the inner face of the wheel;
   a plurality of resilient retention fingers located at a second set of preselected points at spaced apart locations from said first set of points about the circumference of the inner face of the wheel cover, the first end of each of the fingers being secured to the inner face of the wheel cover, the second end of each of the fingers extending axially inward at a distance less than that of the rigid pilot ribs, the second end of each of the fingers also extending radially outward from the first end, defining a circumference slightly larger than the circumference on the retention groove; and
   a generally circular wire spring member secured about its circumference in contact with the inner surfaces of the resilient retention fingers nearest the second ends of the retention fingers,
   whereby, during installation of the wheel cover on the wheel, the rigid pilot ribs simultaneously contact the inner surface of the wheel, thereby limiting radial movement of the wheel cover as the resilient retention fingers subsequently contact the inner surface of the wheel, are compressed radially inward by the inner surface of the wheel and are subsequently forced radially outward by the spring force of the wire member into contact with the retention groove on the wheel.

2. The wheel cover of claim 1 wherein one or more of the fingers includes means defining a groove on the inner surface of the finger nearest the second end, and the circular wire member is retained within the groove.

3. The wheel cover of claim 1 wherein one or more of the ribs have wire retention means for receiving the wire member and limiting radial movement of the wire member.

4. The wheel cover of claim 1 wherein one or more of the ribs have wire retention means for receiving the wire member and limiting axial movement of the wire member.

5. The wheel cover of claim 4 wherein the wire retention means comprises a shoulder portion located on the radially inward edge of the rib, the shoulder portion extending radially inward and retaining the wire member axially inward, thereby preventing outward axial movement of the wire member.

6. The wheel cover of claim 4 wherein the wire retention means comprises a slot defined in the outer edge of the rib for retaining the wire member therein and preventing inward or outward axial movement of the wire member relative to the wheel cover.

7. The wheel cover of claim 6 wherein the slot is deep enough to allow for inward radial motion of the wire member as a result of the compression of the wire member and the resilient fingers during installation.

8. The wheel cover of claim 1 wherein one or more of the ribs have wire retention means for receiving the wire member and limiting circumferential movement of the wire member.

9. A wheel cover for a wheel having a generally annular inner surface including a circumferential retention groove, the wheel cover including:
   pilot means for first engaging the inner surface of the wheel simultaneously at a plurality of preselected positions on the wheel and limiting radial movement of the wheel cover relative to the wheel during installation of the wheel cover on the wheel, said pilot means including a plurality of rigid ribs located at a first plurality of preselected positions about the circumference of the inner face of the wheel cover and extending axially inward from the inner face of the wheel cover farther than any other portion of the wheel cover, the ribs defining a circumference slightly smaller than the smallest circumference on the annular inner face of the wheel; and
   a plurality of reslient retention fingers located at a second plurality of preselected positions which are spaced apart from said first plurality of preselected positions about the circumference of the inner face of the wheel cover, the first end of each of the fingers being secured to the inner face of the wheel cover, the second end of each of the fingers being secured to the inner face of the wheel cover, the second end of each of the fingers extending axially inward at a distance less than that of the pilot means and radially outward from the first end, defining a circumference slightly larger than the retention groove of the inner face of the wheel.

* * * * *

UNITED STATES PATENT AND TRADEMARK OFFICE
CERTIFICATE OF CORRECTION

PATENT NO. : 4,708,398

DATED : November 24, 1987

INVENTOR(S) : Norman S. Loren

It is certified that error appears in the above-identified patent and that said Letters Patent is hereby corrected as shown below:

```
Column 4, Line 67
after "shape" insert --defined--.
```

Signed and Sealed this

Twenty-second Day of October, 1991

Attest:

HARRY F. MANBECK, JR.

*Attesting Officer*   *Commissioner of Patents and Trademarks*